United States Patent [19]
Herring et al.

[11] Patent Number: 5,860,081
[45] Date of Patent: Jan. 12, 1999

[54] INTERFACING AN L2 CACHE TO A SINGLE BUS HAVING ALTERNATIVE PROTOCOLS

[75] Inventors: Christopher M. Herring, Longmont; Forrest E. Norrod, Boulder, both of Colo.

[73] Assignee: National Semiconductor Corporation, Santa Clara, Calif.

[21] Appl. No.: 839,670

[22] Filed: Apr. 15, 1997

Related U.S. Application Data

[63] Continuation of Ser. No. 522,219, Aug. 3, 1995, abandoned.
[51] Int. Cl.$^6$ .................................................. G06F 13/36
[52] U.S. Cl. ........................................... 711/100; 711/117
[58] Field of Search ..................................... 711/100, 117

[56] References Cited

U.S. PATENT DOCUMENTS

| | | | |
|---|---|---|---|
| 5,193,163 | 3/1993 | Sanders et al. | 395/449 |
| 5,276,852 | 1/1994 | Callander et al. | |
| 5,384,737 | 1/1995 | Childs et al. | 365/189.05 |
| 5,410,669 | 4/1995 | Biggs et al. | 395/445 |
| 5,493,655 | 2/1996 | Shen et al. | 395/280 |
| 5,535,377 | 7/1996 | Parks | 395/550 |

OTHER PUBLICATIONS

PCI Local Bus Specification, Rev. 2.0, Apr. 30, 1993, pp.16, 18, 69–77.

Microprocessor Report, "Intel's P6 Uses Decoupled Superscalar Design", by Linley Gwennap, Feb. 16, 1995, pp. 9–15.

Microprocessor Report, "Intel Unveils First PCI Chip Set", by Michael Slater, Dec. 9, 1992, pp. 9–12.

Microprocessor Report, "Digital Reveals PCI Chip Sets For Alpha", by Linley Gwennap, Jul. 12, 1993, pp. 20–22.

Microprocessor Report, "Local Buses Poised to Enter PC Mainstream", by Michael Slater and Mark Thorson, Jul. 8, 1992, pp. 7–13.

Hennessy & Patterson, "Computer Organization & Design The Hardware/Software Interface", Morgan Kaufmann Publishers, Inc., p. 559, 1994.

Micrsoft Press, "Microsoft Press Computer Dictionary: The Comprehensive Standard for Business, School, Library, and Home", pp. 181–182, 1994.

*Primary Examiner*—Tod R. Swann
*Assistant Examiner*—Felix B. Lee
*Attorney, Agent, or Firm*—John L. Maxin

[57] ABSTRACT

A highly integrated central processing unit employs a single external physical bus having first and second protocols to support an L2 cache and a general purpose peripheral interface respectively, to avoid bond-out of the CPU bus to the external world and to steal unused bandwidth for L2 cache accesses while maintaining a standard peripheral bus interface.

20 Claims, 5 Drawing Sheets

INTERFACING AN L2 CACHE TO A SINGLE BUS HAVING ALTERNATIVE PROTOCOLS

The present application is a file wrapper continuation of copending application Ser. No. 08/522,219, filed Aug. 31, 1995, now abandoned.

BACKGROUND OF THE INVENTION

1. Field of the Invention

The invention generally relates to computer systems, and more particularly to a system and method of interfacing a highly integrated microprocessor to a secondary level (L2) cache.

2. Description of Related Art

The trend with integrated circuits, particularly microprocessors, is for greater integration of sub-systems onto a single die which were traditionally provided for off-chip. As a consequence, integrated circuit die sizes are increasing—requiring larger packages. Moreover, another consequence of the increased integration is the so-called "pad-width limited" phenomenon wherein the required interconnections between the die and the outside world have increased to a point where package size and peripheral bond pad widths are approaching theoretical limits.

As way of further background, the Peripheral Component Interconnect (PCI) bus is a widely adopted protocol for use as a so-called "local" or "mezzanine" bus to couple external devices, such as, but not limited to, a video display adapter or memory controller, to a central processing unit (CPU) core without interfering with activity on the immediate "CPU bus". Accordingly, ancillary activities can take place substantially simultaneously without inducing much latency into CPU core execution. The PCI-bus protocol is described in, among other places, the *PCI Local Bus Specification Rev.* 2.0, dated Apr. 30, 1993, by the PCI Special Interest Group, Hillsboro, Oreg., and the *Microprocessor Report* article entitled *Local Buses Poised To Enter PC Mainstream*, dated Jul. 8, 1992, by Michael Slater and Mark Thorson, both herein incorporated by reference.

While the local or mezzanine bus such as the PCI bus provides a decoupled, high bandwidth (with respect to an ISA bus) communication channel with the CPU core, its speed has not kept up with the internal speed of the CPU core. This is due, in part, to the somewhat cumbersome protocol required to support a wide range and variety of peripherals. Currently, for example, the PCI-bus is specified for 33 MHz operation while internal CPU core speeds are exceeding 100 MHz. Additionally, the communication channel bandwidth provided by the local or mezzanine bus tends to be utilized in disjointed temporal chunks—leaving large portions unused.

In traditional microprocessor systems designs, the level-two "L2" cache resides external to the CPU core along with external support logic. The L2 cache is typically coupled to the CPU core through the external CPU bus (address, data, and control lines) and is controlled by the external support logic. This type of L2 cache configuration (along with PCI-bus support circuitry) is exemplified in the *Microprocessor Report* article entitled *Intel Unveils First PCI Chip Set*, dated Dec. 9, 1992, by Michael Slater, and in the *Microprocessor Report* article entitled *Digital Reveals PCI Chip Sets For Alpha*, dated Jul. 12, 1993, by Linley Gwennap. A drawback with this L2 cache configuration is that the CPU bus must be made external—compounding the required number of pins, pad-width limitations, and packaging size limitations.

Another L2 cache configuration is exemplified in the *Microprocessor Report* article entitled *Intel's P6 Uses De-coupled Superscalar Design*, dated Feb. 16, 1995, by Linley Gwennap. This configuration employs the so-called Multi-Chip-Module (MCM) wherein two or more separate die are included in one physical package. In the particular case of the P6 microprocessor, the L2 cache resides on a separate die from the CPU core and is coupled together by a dedicated L2 cache bus rather than the CPU bus. A drawback with this configuration is that the L2 cache type and size must be fixed at the time of manufacture of the MCM. Another drawback with this configuration is that the entire MCM must be scrapped if either the L2 cache or the CPU core is defective. Yet another drawback with this configuration is that the dedicated cache bus must be bonded internally within the package between the CPU core and the L2 cache—increasing the package size and cost.

As a way of further background, the *PCI Local Bus Specification Rev.* 2.0 defines optional cache support pins (SBO# and SDONE) for cacheable memory. This approach however, has at least two limitations. First, the SBO# and SDONE pins are intended only to support cache memory local to a PCI master device on the PCI-bus which typically is separate and disenfranchised from the CPU core. Secondly, adherence to the PCI-bus protocol throttles L2 cache performance.

As a way of yet even further background, integrating a PCI-bus master and support logic into the CPU requires additional die space and more importantly, an addition of a minimum of forty-nine external pins. Consequently, up until now, integrating a PCI-bus and supporting an L2 cache (requiring access to the CPU bus or a dedicated bus) has been impracticable due to pin, pad width, packaging, and cost limitations.

Accordingly, it can be seen that there is a need for a system and method of interfacing an L2 cache to a highly integrated central processing unit employing a local bus without limiting L2 cache performance, while maintaining a general purpose local bus that is compatible with a standard protocol.

SUMMARY OF THE INVENTION

To overcome the limitations of the prior art described above, and to overcome other limitations that will become apparent upon reading and understanding the present specification, the present invention discloses a highly integrated central processing unit having L2 cache support employing a time-multiplexed, on-demand bus, separate from the CPU bus, to support both a high performance L2 cache as well as other peripherals adhering to a lower performance local bus protocol. An integrated L2 cache controller and local bus controller cooperate to support different protocols depending on whether L2 cache or local bus operation is required. To minimize external pin count, the shared bus provides both high bandwidth L2 cache bus support and a general purpose peripheral bus, to decouple the CPU core from peripheral activities.

A feature of the present invention is supporting an L2 cache and a general purpose local peripheral bus without supplying the CPU bus external to the CPU and without supplying an additional external bus.

Another feature of the present invention is supplying a shared physical bus having different protocols depending on its use, for supporting a general purpose peripheral bus and an L2 cache.

Another feature of the present invention is supporting a variable size L2 cache on a shared bus having different protocols without supplying the CPU bus external to the CPU.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a highly integrated central processing unit having L2 cache support employing a general purpose local bus separate from the CPU bus, such as, but not limited to, a PCI bus, without adhering to the local bus protocol, practiced in accordance with the present invention.

DESCRIPTION OF THE PREFERRED EMBODIMENTS

Figure 1:
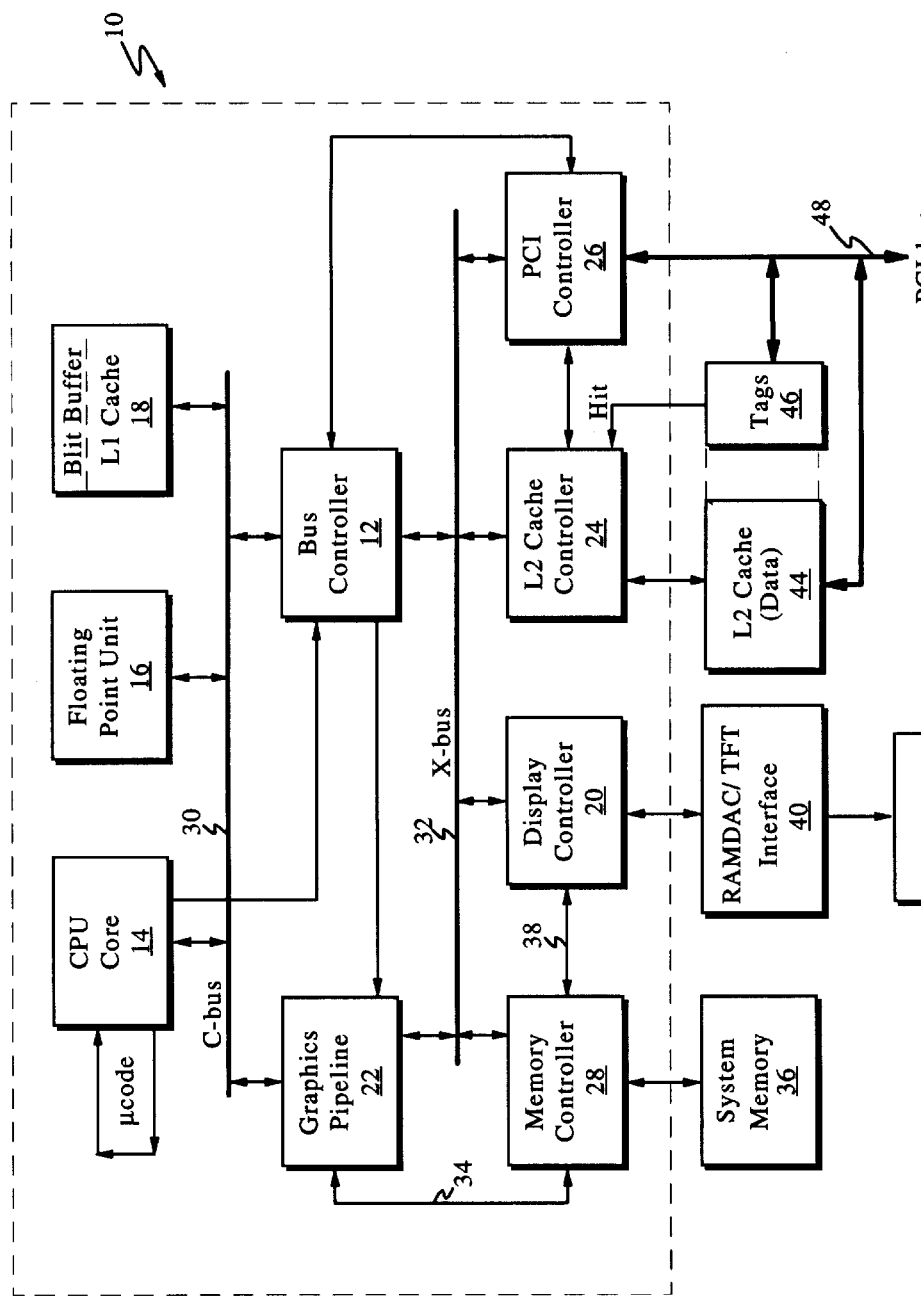
FIG. 1 is a block diagram of a system practiced in accordance with the principles of the present invention.

The detailed description of the preferred embodiments for the present invention is organized as follows:
1. Exemplary System Employing An L2 Cache Interface
2. SRAM Configurations For The L2 Cache
3. Multiuse Pin Circuitry
4. L2 Cache Controller—PCI Controller
   4.1 Cache Fill Contention with PCI Accesses
   4.2 X_Hvalid and X_L2_FILL Protocol
   4.3 Write Cycles
   4.4 Read Cycles
5. L2 Cache Data Path
6. L2 Cache Control Path
7. Conclusion This organizational table, and the corresponding headings used in this detailed description, are provided for the convenience of reference only and are not intended to limit the scope of the present invention. It is to be understood that while the preferred embodiment is described hereinbelow with respect to the x86 computer architecture, it has generally applicability to any architecture. Certain terminology related to the x86 computer architecture (such as register names, signal nomenclature, etc.) which is known to practitioners in the field of microprocessor design, is not discussed in detail in order not to obscure the disclosure. Throughout the specification, the "#" symbol following a signal name designates that it is active low.

Moreover, the structural details which will be readily apparent to those skilled in the art having the benefit of the description herein have been illustrated in the drawings by readily understandable block representations showing and describing only those details that are pertinent to the present invention. The block diagrams in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

1. Exemplary System Employing An L2 Cache Interface

Reference is now made to FIG. 1 which depicts an exemplary central processing unit (CPU) 10 employing a method of L2 cache support in accordance with the principles of the present invention. The CPU 10 includes the following functional units: an internal bus controller 12, a CPU core 14, a (level-two) L2 cache controller 24, a PCI-bus controller 26, and a memory controller 28 and preferably, although not exclusively, includes a floating point unit (FPU) 16, a (level-one) L1 cache 18, part of which is definable as a scratchpad memory (a.k.a. blit buffer), a display controller 20, and a graphics pipeline (a.k.a. graphics accelerator) 22.

The CPU core 14, the FPU 16, the L1 cache 18, the graphics pipeline 22, and the bus controller 12 are coupled together through an internal C-Bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal X-bus 32. The details of the C-bus 30 and X-bus 32 are not necessary for the understanding of the present invention. It is sufficient to understand that independent C and X buses 30 and 32 decouple these functional units within the CPU 10 so that for example, the CPU core 14, the FPU 16, and L1 cache 18 can operate substantially autonomously from the remainder of the CPU 10 and so that other activities (e.g. PCI-bus transfers L2 cache transfers and video updates) can be conducted independently.

The graphics pipeline 22, which is coupled to the memory controller 28 through fast link 34, provides a graphical user interface (GUI) that expedites block moves of data from the blit buffer to frame buffer memory which in the preferred embodiment, resides in the system memory 36. BitBlt operations are initiated by writing to a control register (not shown) in the CPU core 14 which specifies: i) the type of source data (none, frame buffer, or blit buffer), ii) the type of destination data (none, frame buffer, or blit buffer), iii) where the graphics pipeline 22 writes the data (frame buffer, or system memory 36), and iv) a source expansion flag. When the source data is a bitmapped image, data is loaded from system memory 36 into the blit buffer before starting the BitBlt operation. Destination data is also loaded into the blit buffer when the graphics pipeline 22 renders to system memory 36.

The display controller 20 which is coupled to the memory controller 28 through a fast link 38, retrieves image data from the frame buffer memory, performs a color look-up if required, inserts cursor and icon overlays into a pixel data stream, generates timing, and formats the pixel data for output to a RAMDAC/Thin Film Transistor (TFT) interface 40 which in turn drives a display 42.

The L1 cache 18 is preferably, although not exclusively, a 16K byte unified data/instruction cache that operates in either a write-through or write-back mode. A region of the L1 cache 18 can be programmably dedicated as the blit buffer through configuration control registers (not shown) in the CPU core 14 for use by the graphics pipeline 22. Whenever data is moved on the display 42, a raster line (scanline) of data is read from the frame buffer in system memory 36, written to the blit buffer region of the L1 cache 18, and then read back out and written to another region of the frame buffer. Programs executed by the CPU core 14 can also directly put data into the blit buffer region and have the graphics pipeline 22 autonomously read it out and put it in the frame buffer.

The preferred L1 cache 18 is described in co-pending U.S. patent application Ser. No.: 08/464,921, filed Jun. 5, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

As described in more detail hereinbelow, the L2 cache controller 24 and PCI controller 26 collectively provide, inter alia, a high speed interface for an "off-chip" L2 cache 44 (with respect to the CPU 10). It is to be understood that while the L2 cache 44 shares the same physical data, address, and control lines on the PCI-bus 48, that for performance reasons, the clock speed and communication protocol is not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit. In the preferred embodiment, the cache tag and control logic circuitry 46, which determines whether a hit/miss has occurred, is provided separately from the data cache 44 in external chipset logic circuitry. Those skilled in the art will recognize other forms and arrangements for the cache tag and control logic circuitry 46, such as, but not limited to, integrated circuitry onto the CPU 10, without departing from the scope of the present invention.

2. SRAM Configurations for the L2 Cache

Figure 2:
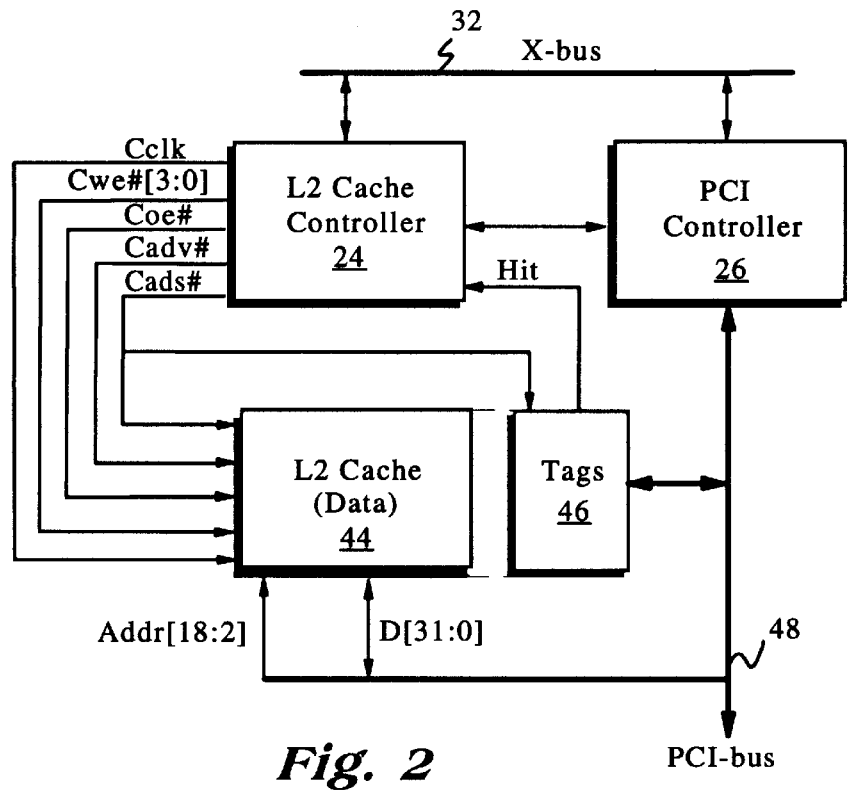
FIG. 2 is a block diagram of a synchronous L2 cache configuration, practiced in accordance with the principles of the present invention.
Figure 3:
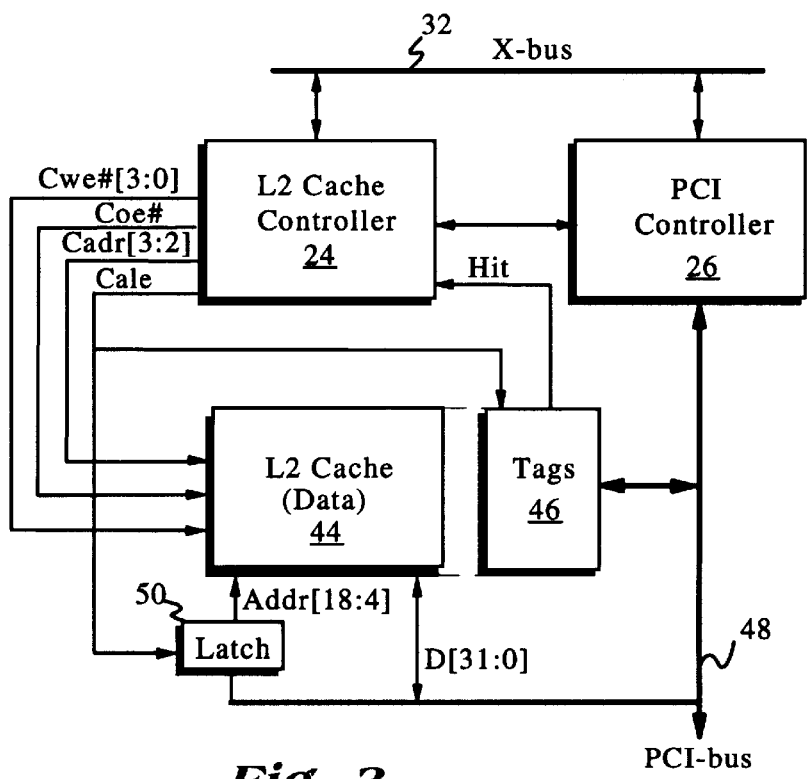
FIG. 3 is a block diagram of an asynchronous L2 cache configuration, practiced in accordance with the principles of the present invention.

The preferred embodiment of the present invention supports 128K or 256K byte synchronous (pipelined and non-pipelined) or asynchronous static RAMs (SRAMs) for the data portion of the external L2 cache 44. Those skilled in the art will recognize other forms, sizes, and speeds of SRAMs for the data portion of the L2 cache 44 without departing from the scope of the present invention. FIG. 2 depicts a block diagram for a synchronous SRAM configuration while FIG. 3 depicts a block diagram for an asynchronous configuration. The salient difference between the two configurations is the addition of an address latch 50 (FIG. 3) between the multiplexed address/data PCI-bus 48 and the L2 cache 44 and the additional/different control signals, described in more detail hereinbelow.

The address to the L2 cache tag and control logic circuitry 46 is supplied over the PCI-bus 48 in a clock cycle in which the Cads#/Cale signal (Cache Address Strobe/Cache Latch Enable) is active. More specifically, in the synchronous configuration, the Cads# signal initiates a tag lookup in cache tag and control logic circuitry 46 and directly strobes the SRAM in the data portion of the L2 cache 44. In the asynchronous configuration, the Cale signal initiates a tag lookup in cache tag and control logic circuitry 46 and enables latch 50 to latch the address off the PCI-bus 48. The Cads#/Cale signal is only active for addresses that are cacheable as determined by the internal bus controller 12 (FIG. 1)—otherwise it is tri-stated and held in the inactive state by a pull-up or pull-down resistor (not shown). On the subsequent clock cycle in either configurations, the multiplexed PCI-bus 48 supplies the data for the L2 cache 44 transfer. It is to be understood that during L2 cache transfers, the meaning of "PCI-bus 48" is the physical bus (i.e. traces or connections for data, address, and control lines) rather than its logical or protocol meaning as defined under the *PCI Local Bus Specification Rev.* 2.0. Accordingly, during L2-cache transfers, the clock speeds and handshake protocols on the PCI-bus 48 are not necessarily in conformance with the PCI protocol, but rather, are optimized along with other sideband signals, for fast L2 cache throughput.

Data writes over the PCI-bus 48 cause a tag look-up in the cache tag and control logic circuitry 46. With every active Cads#/Cale cycle, the cache tag and control logic circuitry 46 latches address and control bits on the PCI-bus 48. For valid cycles that are writes to the L2 cache 44, the cache tag and control logic circuitry 46 writes the address compare bits into the appropriate cache line in the tag and marks the cache line as valid. For reads or writes to the L2 cache 44, cache tag and control logic circuitry 46 looks up the address compare bits for the appropriate line and compare the bits to the address compare bits for the current cycle. If there is a match, cache tag and control logic circuitry 46 drives the Hit signal active to indicate a match with the tag.

In the preferred embodiment, the line size of the L2 cache 44 is sixteen bytes wide—Dword addressable. Consequently, the least significant two address bits on the PCI-bus 48 are not needed during the address transfer while the Cads#/Cale signal is active. Accordingly, as depicted in Table 1 below, least significant address bits Addr[1] and Addr[0] are used alternatively to indicate cycle type to cache tag and control logic circuitry 46.

TABLE 1

| Cads#/Cale | Addr[1] | Addr[0] | Description |
|---|---|---|---|
| Active | 0 | 0 | Low power cycle - do not update tag |
| Active | 0 | 1 | Ignore - Do not update tag |
| Active | 1 | 0 | Cycle is a cache read inquiry - Provide a Hit |
| Active | 1 | 1 | Cycle is a cache write update tag |
| Inactive | x | x | Bits[1:0] are data lines |

3. Multiuse Pin Circuitry

Figure 4:
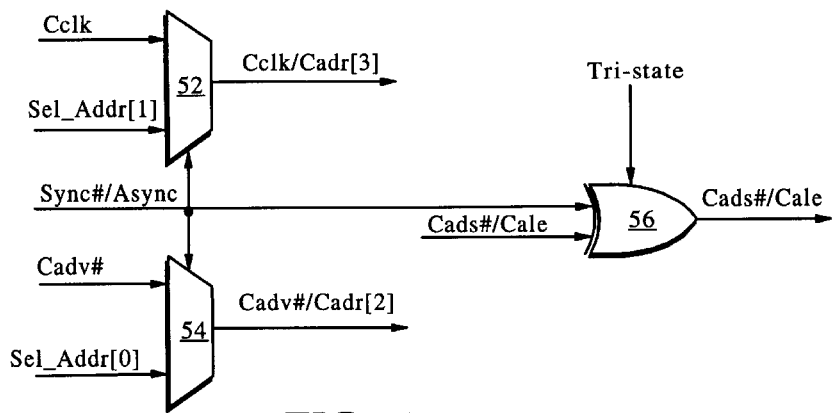
FIG. 4 is a diagram of circuitry that provides multi-use pins in the L2 cache controller.

Reference is now made to FIG. 4 which depicts circuitry for generating L2 cache control signals based on whether synchronous or asynchronous SRAM operation is selected. A first multiplexer 52 has a first input coupled to a cache clock signal (Cclk) and a second input coupled to a control signal Sel_Addr[1]. Cclk is a cache clock generated by circuitry (not shown) whose exact details are not necessary for the understanding of the invention. It is sufficient to understand that the Cclk signal is preferably some derivative multiple of the core clock used to clock the CPU core 14. The Sel_Addr[1] signal is the least significant plus-one address bit generated by address generation circuitry 58 (FIG. 6) whose exact details are not necessary for the understanding of the invention. The Sync#/Async control signal, which selects synchronous or asynchronous SRAM operation, selectively routes either Cclk or Sel_Addr[1] through multiplexer 52 to either the Cclk or Cadr[3] input on the SRAMs in the data portion of the L2 cache 44.

Figure 6:
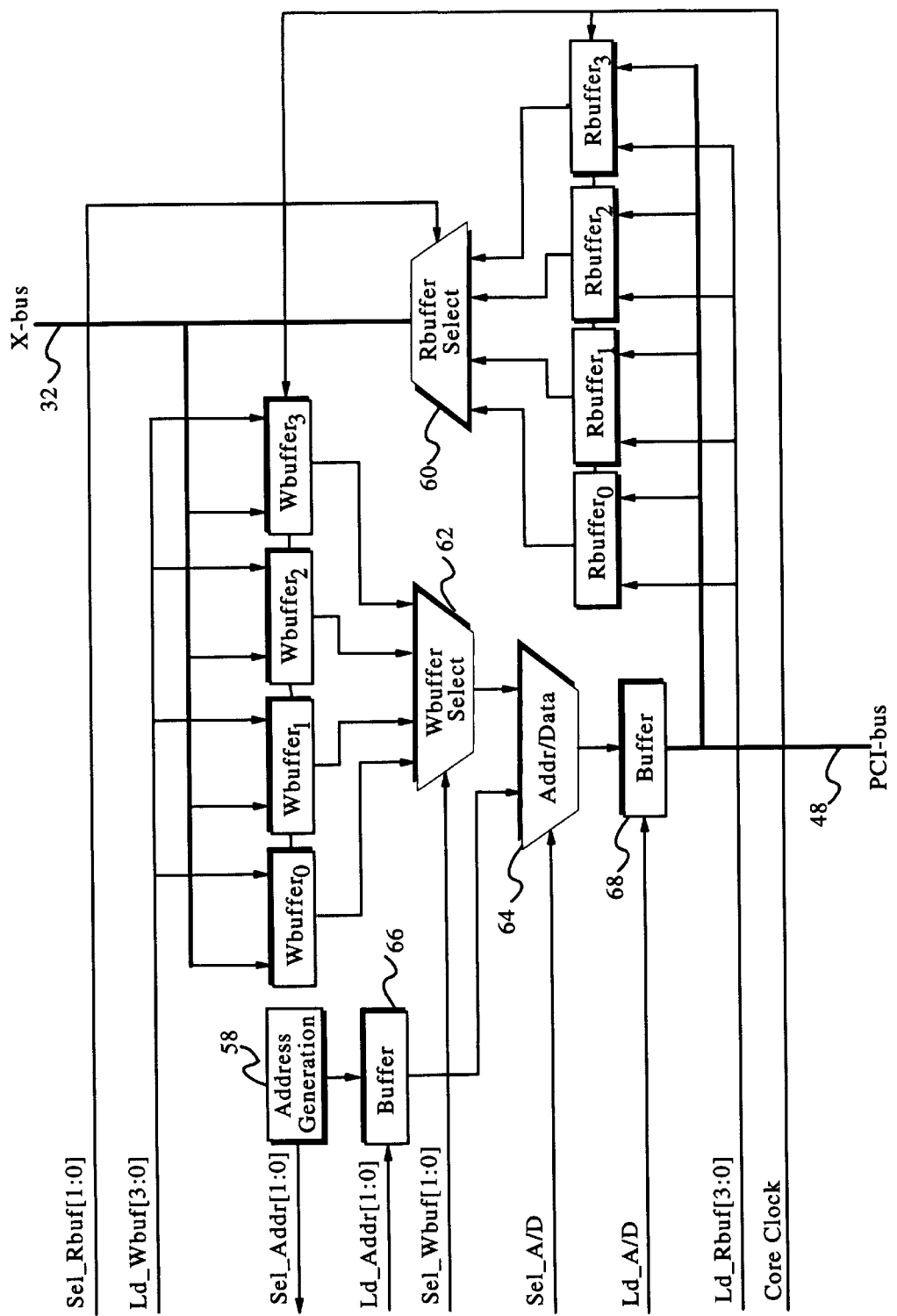
FIG. 6 is a block diagram of the data path for L2 cache accesses.

A second multiplexer 54 has a first input coupled to the Cadv# signal and a second input coupled to the Sel__Addr[0] signal. The Cadv# signal is a cache address advance signal generated by circuitry (not shown) whose exact details are not necessary for the understanding of the invention. It is sufficient to understand that the Cadv# signal when asserted, increments the address to the next address. The Sel__Addr[0] signal is the least significant address bit generated by address generation circuitry 58 (FIG. 6). The Sync#/Async control signal selectively routes either Cadv# or Sel__Addr [0} through multiplexer 54 to either the Cadv#/Cadr[2] input on the SRAMs in the data portion in the L2 cache 44.

An Exclusive-OR (XOR) gate 56 has a first input coupled to the Cads#/Cale signal and a second input coupled to the Sync#/Async control signal. The XOR gate 56 is essentially a programmable inverter—inverting the Cads#/Cale signal when the Sync#/Async control signal is a logic one.

4. L2 Cache Controller—PCI Controller

Figure 5:
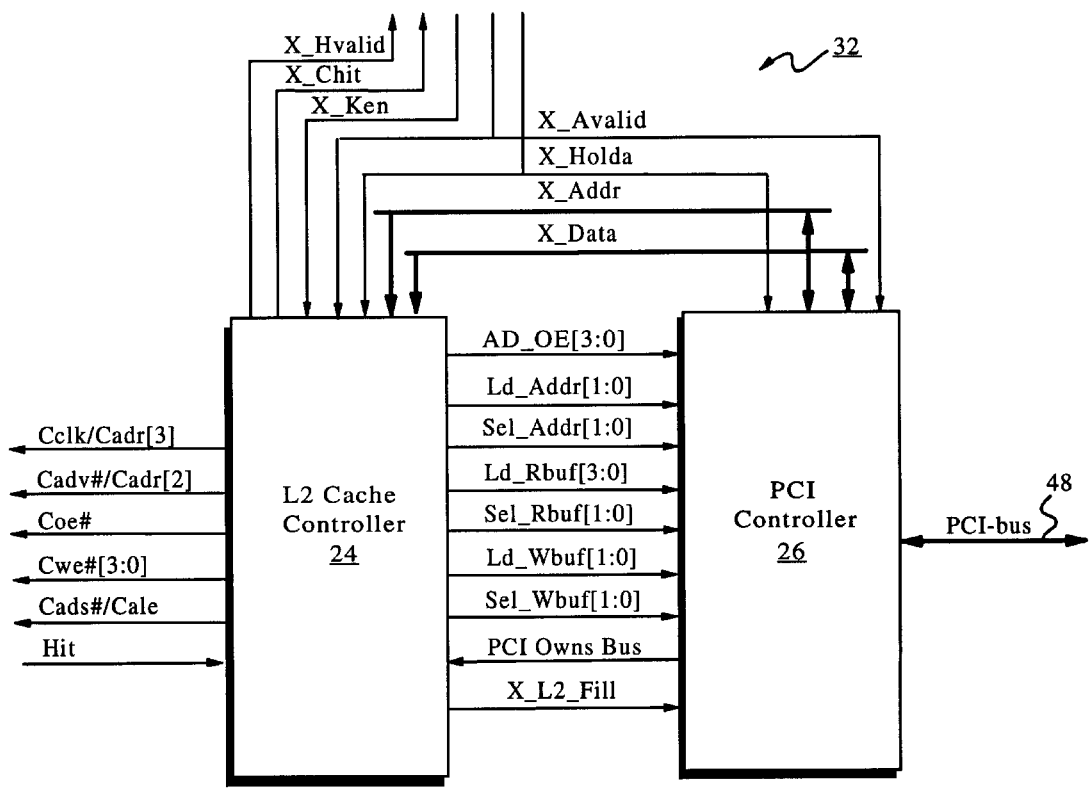
FIG. 5 is a more detailed block diagram depicting the coupling between the L2 cache controller and the local bus controller.

Referring now to FIG. 5, a more detailed block diagram is depicted of the coupling between the L2 cache controller 24 and the PCI controller 26. The L2 cache controller 24 signals the PCI controller 26 to latch and drive the PCI-bus 48 with the address information on the X address bus (X__Addr) when the internal bus controller 12 (FIG. 1) asserts the X__Avalid and X__Ken signals. The L2 cache controller 24 provides the PCI controller 26 with four address/data enable signals (AD__OE[3:0]) for individually enabling each of four byte portions on the PCI-bus 48. As pointed out hereinabove, the PCI-bus 48, during L2 cache transfers, refers to the physical rather than logical bus.

A Hit signal generated from cache tag and control logic circuitry 46 is sampled by the L2 cache controller 24 a programmable number of SRAM clocks (Cclk) after the Cads#/Cale signal is asserted. The L2 cache controller 24 then asserts the X__Hvalid signal and drives the X__Chit line with the value of Hit to indicate to the internal bus controller 12 (FIG. 1) of an occurrence of an L2 cache hit or miss.

When a read hit occurs in the cache tag and control logic circuitry 46, the L2 cache controller 24 asserts the Ld__Rbuf [1:0] signals to read data from the L2 cache 44 over the PCI bus 48 into read buffers in the PCI controller 26 (described in more detail hereinbelow). After the data is read into the read buffers and the internal bus controller 12 (FIG. 1) asserts the X__Ads# signal to indicate a valid cycle active, the L2 cache controller 24 asserts the ready signal X__Rdy# to the internal bus controller 12 and the Sel__Rbuf[1:0] signals to the PCI controller 26 to drive the data onto the X data bus (X__Data) according to a predetermined burst read protocol.

On a cacheable read (indicated by X__Ken active with XAds#) miss (indicated by X__Avalid with X__Chit not active) to the L2 cache 44, the system memory controller 36 (FIG. 1) supplies data to the data portion of the X-bus 32 (X__Data). The L2 cache controller 24 signals the PCI controller 26 through the Ld__Wbuf[3:0] signals to latch the data on X__data into the PCI write buffers. Similarly on a write hit to the L2 cache 44, the L2 cache controller 24 signals the PCI controller 26 through the Ld__Wbuf[3:0} signals to latch the data on X__data.

4.1 Cache Fill Contention with PCI Accesses

The PCI Owns Bus and X__L2__FILL signals prevent contention between the PCI controller 26 and the L2 cache controller 24. To this end, the PCI-bus 48 is physically one bus with two logically different protocols depending on whether an L2 cache or PCI compliant device access is made. The PCI protocol is well documented in the *PCI Local Bus Specification Rev.* 2.0 dated Apr. 30, 1993, by the PCI Special Interest Group, Hillsboro, Oreg. The L2 cache protocol and the system and method for interlacing it with the PCI protocol is thus described to illustrate how bandwidth is appropriated on the PCI-bus 48 while maintaining PCI compliant.

The PCI controller 26 cannot complete an X-bus 32 transaction to the PCI-bus 48 if the L2 cache controller 24 owns the PCI-bus 48. When X__L2__Fill is asserted, any cycles to the X-bus 32 that would go to the PCI-bus 48 are queued until X__L2__Fill is de-asserted by the L2 cache controller 24 indicating that the PCI controller 26 can own the physical PCI-bus 48. If an external PCI master device desires the PCI-bus 48, indicated by an active PCI REQ# (not shown), the PCI controller 26 will not grant the bus until X__L2__Fill is de-asserted and the X__Holda handshake signal from the bus controller 12 (FIG. 1) goes active.

The PCI Owns Bus signal is active if the PCI controller 26 is currently operating in PCI protocol or if there are cycles pending to the PCI-bus 48 from a PCI compliant device. While the PCI Owns Bus signal is active, the L2 cache controller 24 cannot begin cycles to the L2 cache 44. Any cacheable addresses on the X-bus 32 that occur while the PCI Owns Bus signal is active will be queued by the L2 cache controller 24 until the PCI Owns Bus signal goes inactive and the PCI-bus 48 can revert to L2 cache protocol.

4.2 X__L2__Fill and X__Hvalid Protocols

The X__L2__Fill signal goes active if the L2 cache controller 24 is waiting to complete a write cycle or if a tag look up is in progress for a write cycle or a burst read cycle. The L2 cache controller 24 waits to complete a write cycle when a burst read miss to a cacheable line or a write hit occurs. The tag look up in progress occurs when the cache tag and control logic circuitry 46 has not completed a tag lookup for a cacheable write cycle or for a cacheable burst read. If a hit occurs for the write or a miss occurs for the burst read, then the X__L2__Fill signal remains active until the write or update is complete.

X__Hvalid goes active only for read cycles that have not been started by the memory controller 28 (FIG. 1). X__Hvalid is driven for one clock if the X-bus address strobe (X__Ads#) has been given and if the memory controller 28 (FIG. 1) has not already returned the first ready signal (X__Rdy#) for a read cycle. If X__Ads# has not occurred, the X__Hvalid and X__Chit signals are driven active up until the clock when X__Ads# is sampled active. X__Hvalid is not driven for write cycles, for non-cacheable reads, or for reads in which the memory controller 28 (FIG. 1) has driven X__Rdy#.

4.3 Write Cycles

If X__L2__Fill is not active, the memory controller 28 can buffer the write and return X__Rdy# to the internal controller 12. If X__L2__Fill is active, the memory controller 28 waits for X__L2__Fill to become inactive before it returns X__Rdy# for the write cycle since all writes go to system memory 36 (FIG. 1) and to the L2 cache 44.

4.4 Read Cycles

If X__L2__Fill is not active, the memory controller 28 waits for X__Hvalid to go active to determine what action to take. If X__Chit is inactive, the memory controller 28 completes the read to system memory 36. If X__Chit is active, the memory controller 28 cancels the read and the L2 cache controller 24 completes the read to the L2 cache 44. If X__L2__Fill is active during X__Ads#, the memory controller 28 starts the access to system memory 36. If the memory controller 28 samples X__Hvalid active before X__Rdy# is returned and if X__Chit is active, the memory controller 28 aborts the read. If the memory controller 28 returns X_Rdy# before X_Hvalid is active, the L2 cache controller 24 cancels the read inquiry.

5. L2 Cache Data Path

Reference is now made to FIG. 6 which depicts the read and write data paths for the present invention. It should be understood at the outset that the read and write buffers (Rbuffer$_0$–Rbuffer$_3$ and Wbuffer$_0$–Wbuffer$_3$, respectively,) are shared by the control logic for both the PCI-bus and the L2 cache. Reads from the L2 cache 44 are stored in one-of-four—four byte (Dword) read buffers (Rbuffer$_0$–Rbuffer$_3$). Each read buffer is clocked by the core clock and gated by control signals Ld_Rbuf[0]–Ld_Rbuf[3], respectively. The core clock is generated by clock circuitry whose exact details are not necessary for the understanding of the present invention. Control signals Ld_Rbuf[0]–Ld_Rbuf[3] are generated by the control path described in more detail hereinbelow. The data from read buffers Rbuffer$_0$–Rbuffer$_3$ is unloaded to the X-bus 32 through a four-to-one multiplexer 60. Control signals Sel_Rbuf[1:0] from the control path described hereinbelow, select the appropriate read buffer through multiplexer 60 and synchronize the data from the PCI-bus 48 (L2-bus) to the X-bus 32.

Each of four—four byte write buffers (Wbuffer$_0$–Wbuffer$_3$) are clock by the core clock and gated by control signals Ld_Wbuf[0]–Ld_Wbuf[3] generated by the control path described hereinbelow. The data from the write buffers is passed through a four-to-one multiplexer 62. Control signals Sel_Wbuf[1:0] from the control path described hereinbelow, select the appropriate write buffer through multiplexer 62 and synchronize the data from the X-bus 32 to the PCI-bus 48 (L2-bus). The output of the multiplexer 62 is coupled to a first input on a two-to-one multiplexer 64. A second input to the two-to-one multiplexer 64 is coupled to receive an address from address buffer-latch 66. Multiplexer 64 routes either the address from buffer-latch 66 or data from multiplexer 62 to buffer-latch 68. Buffer-latches 66 and 68 are controlled by control signals Ld_Addr[1:0] and Ld_A/D, respectively.

6. L2 Cache Control Path

Figure 7:
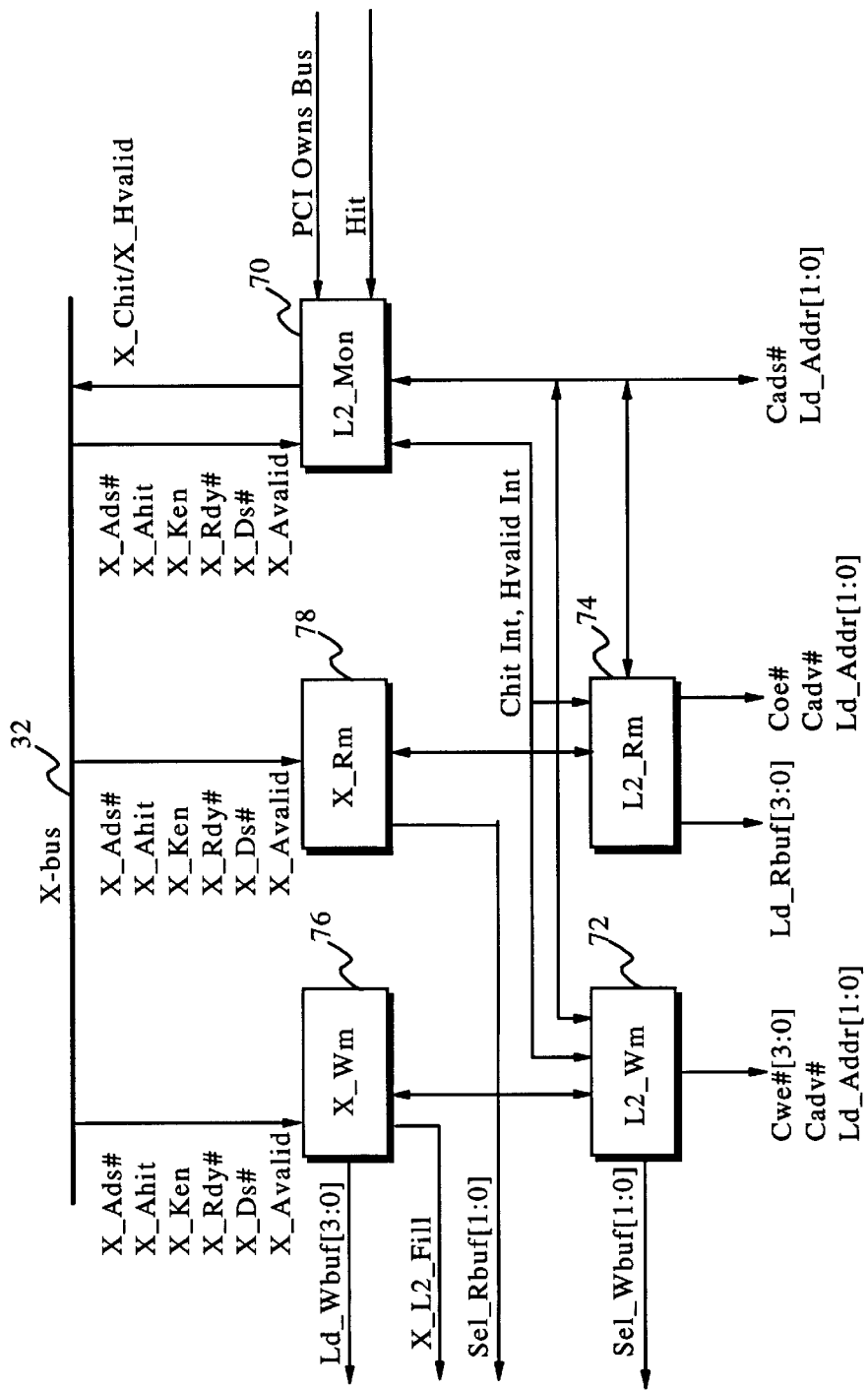
FIG. 7 is a block diagram of the control path for L2 cache accesses.

Reference is now made to FIG. 7 which depicts a block diagram of the control path for the present invention. The X_Avalid signal is generated by the internal bus controller 12 to request that the L2 cache controller 24 or PCI controller 26 decode the address on the X-bus 32. The X_Ahit signal is generated by the L2 cache controller 24 to indicate that it decoded the address on the X-bus 32 and will service the ensuing transaction. The X_Ken is a signal driven by internal bus controller 12 to indicate that the data is cacheable. The X_Ds# is a signal driven by the internal bus controller 12 to indicate valid data transfer. The X_Ads# is an address strobe driven by the internal bus controller 12 to indicate that the address information on the X-bus 32 is valid and a valid transfer has begun. The X_Rdy# is a signal driven by the L2 cache controller 24 to indicate that it is ready.

The L2_Mon control block 70 receives the PCI Owns Bus, Hit, Cads#, Ld_Addr[1:0], Chit Int, Hvalid Int, X_Ads#, X_Ahit, X_Ken, X_Rdy#, X_Ds#, and X_Avalid signals and generates the Xchit, X_Hvalid, and Cads# signals. The L2_Mon control block includes circuitry to track activity on the X-bus 32, perform query cycles to determine hit/miss for cacheable addresses, and places the L2 cache 44 into a low power mode when no activity detected.

The L2_Wm control block 72 receives the Cads#, Ld_Addr[1:0], Chit Int, and Hvalid Int signals and generates the Sel_Wbuf[1:0], Cwe#[3:0], Cadv#, and Ld_Addr[1:0] signals. The L2_Wm control block 72 includes circuitry to handle write cycles due to write hits or read miss cycles that result in new lines being written to the L2 cache 44.

The L2_Rm control block 74 receives the Cads#, Ld_Addr[1:0], Chit Int, Hvalid Int and generates the Ld_Rbuf[3:0], Coe#, Cadv#, and Ld_Addr[1:0] signals. The L2_Rm control block 74 includes circuitry that handles read hit cycles to the L2 cache 44 by controlling the loading of the read buffers (Rbuffer$_0$–Rbuffer$_3$).

The X_Wm control block 76 receives the X_Ads#, X_Ahit, X_Ken, X_Rdy#, X_Ds#, and X_Avalid signals and generates the Ld_Wbuf[3:0] and X_L2_Fill signals. The X_Wm control block 76 includes circuitry to control loading of the write buffers (Wbuffer$_0$–Wbuffer$_3$) for write cycles.

The X_Rm control block 78 receives the X_Ads#, X_Ahit, X_Ken, X_Rdy#, X_Ds#, and X_Avalid signals and generates the Sel_Rbuf[1:0] signals. The X_Rm control block 78 handles unloading of read data by selecting multiplexer 74 with Sel_Rbuf[1:0] on read hit cycles.

The X_Wm and X_Rm blocks 76 and 78 respectively, run at the clock speed of the X-bus 32. The L2_Wm and L2_Rm control blocks 72 and 74 respectively, are run at the speed of the SRAM clock (Cclk). The L2_Mon control block 70 is a hybrid and runs at both the speed of the X-bus 32 and the SRAM clock (Cclk).

7. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the Claims.

What is claimed is:

1. A system of interfacing a highly integrated microprocessor to an L2 cache comprising:
   (a) a CPU core disposed in the highly integrated microprocessor;
   (b) a local bus having a local bus protocol and an L2 cache bus protocol, disposed external to the highly integrated microprocessor;
   (c) an L2 cache coupled to the local bus;
   (d) an L2 cache controller disposed in the highly integrated microprocessor and coupled to the CPU core, for arbitrating requests to the L2 cache; and,
   (e) a local bus controller disposed in the highly integrated microprocessor, coupled to the CPU core and between the L2 cache controller and the local bus, for selecting either the local bus protocol or the L2 cache bus protocol to transfer data over the local bus.

2. A system as recited in claim 1 wherein the L2 cache bus protocol has a clock frequency higher than the local bus protocol.

3. A system as recited in claim 1 wherein the clock frequency of the L2 cache bus protocol is a multiple of a clock frequency for the CPU core.

4. A system as recited in claim 1 wherein the L2 cache bus protocol employs least significant address bits to encode cycle type information for L2 cache accesses.

5. A system as recited in claim 1 wherein the L2 cache comprises static RAMs to hold cache data.

6. A system as recited in claim 5 further comprising multiuse pin circuitry to define external pin functions depending on a type of static RAM used for the L2 cache.

7. A system as recited in claim 1 wherein the static RAMs are asynchronous.

8. A system as recited in claim 1 wherein the static RAMs are synchronous.

9. A system as recited in claim 8 wherein the synchronous static RAMs are pipelined.

10. A system as recited in claim 1 wherein the local bus protocol adheres to a Peripheral Component Interconnect specification.

11. A system employing a time-multiplexed, on-demand bus separate from a CPU bus, to support a high performance secondary cache bus protocol and a lower performance, general purpose, peripheral device bus protocol, comprising:

(a) core means for executing instructions;

(b) secondary cache means coupled to the on-demand bus, for caching data from the core means;

(c) secondary cache controller means, coupled to the CPU core means, for arbitrating requests to the secondary cache means; and, (d) bus controller means, coupled between the secondary cache controller means and the on-demand bus, and to the core means, for selecting either the high performance secondary cache bus protocol or the general purpose peripheral device bus protocol, for transferring data over the on-demand bus.

12. A system as recited in claim 11 wherein the secondary cache bus protocol has a clock frequency higher than the general purpose peripheral device bus protocol.

13. A system as recited in claim 11 wherein the clock frequency of the secondary cache bus protocol is a multiple of a clock frequency for the core means.

14. A system as recited in claim 11 wherein the secondary cache bus protocol employs least significant address bits to encode cycle type information for accesses to the secondary cache means.

15. A system as recited in claim 11 wherein the secondary cache means comprises static RAMs to hold cache data.

16. A system as recited in claim 15 further comprising multiuse pin means for defining external pin functions responsive to a type of static RAM used for the secondary cache means.

17. A method of interfacing a highly integrated microprocessor which includes an L2 cache controller and a local bus controller, to an L2 cache over a local bus having first and second protocols, comprising the steps of:

(a) requesting reads and writes from a CPU core to the L2 cache over the local bus using the first protocol;

(b) requesting reads and writes from a local bus master device over the local bus using the second protocol; and, (c) arbitrating steps (a) and (b) using the L2 cache controller and the local bus controller.

18. A method as recited in claim 17 further comprising a step of encoding cycle type information in least significant address bits on the local bus for accesses to the L2 cache.

19. A method as recited in claim 17 further comprising a step of defining external pin functions depending on a type of static RAM used for the L2 cache.

20. A method as recited in claim 17 wherein step (c) further comprises the step of querying whether a local bus master device has control over the local bus.

* * * * *